July 6, 1926.

H. C. PIERCE

TIRE LOCK

Filed Jan. 29, 1926

1,591,050

Inventor

H. C. Pierce

By Philip A. H. Ferrell

Attorney

Patented July 6, 1926.

1,591,050

UNITED STATES PATENT OFFICE.

HAROLD CARTWRIGHT PIERCE, OF POMONA, CALIFORNIA.

TIRE LOCK.

Application filed January 29, 1926. Serial No. 84,623.

The invention relates to tire locks for locking tires on automobile wheels whereby they will be prevented from being removed by unauthorized persons, and has for its object to provide a device of this character which may be applied to a conventional form of automobile tire valve without varying the construction thereof, and at the same time constructed in a manner whereby it will be entirely supported and attached to the tire valve.

A further object is to provide a tire lock comprising a cylindrical member threaded on a tire valve stem and provided with recesses at opposite sides thereof for the reception of the arms of the U-shaped member which engage the flat sides of the valve stem and prevent rotation of the member threaded on the valve stem. Also to provide a lock casing housing the member threaded on the valve stem and provided with a bolt, key controlled, which is adapted to be received in an annular channel of the member threaded on the valve stem for preventing removal of the lock casing. The annular channel forms means whereby the lock and lock casing may rotate on the member threaded on the stem, thereby preventing unauthorized persons from applying a prying action thereon.

A further object is to provide a hardened nut on the inner end of the stem and adapted to engage the outer periphery of the rim and forming means whereby the cutting of the stem by an insertion of a tool under the tire casing is prevented.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
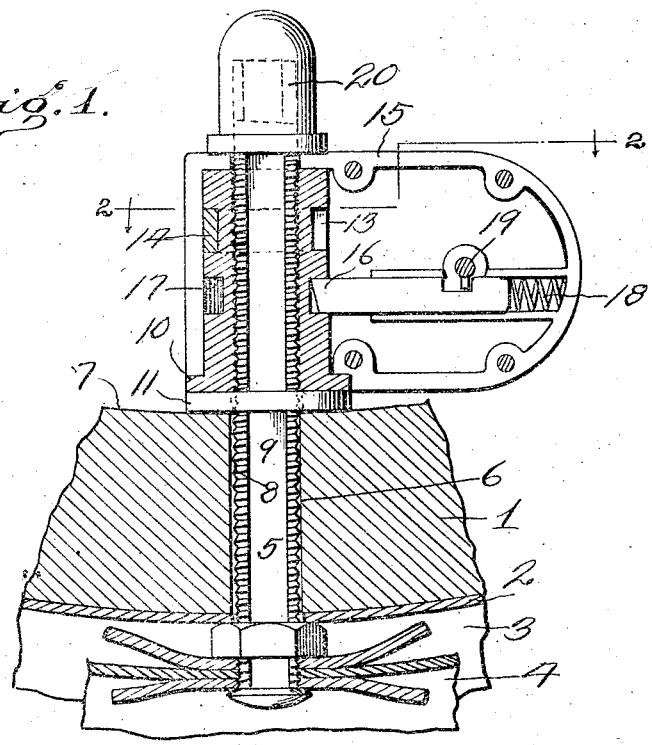
Figure 1 is a vertical longitudinal sectional view through the lock and a portion of a wheel, showing the lock applied to a valve stem.
Figure 2:
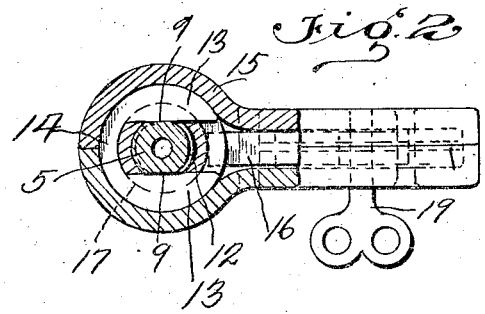
Figure 2 is a horizontal sectional view taken on line 2—2 of Figure 1.
Figure 4:
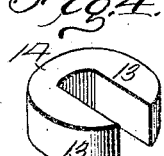
Figure 4 is a perspective view of the U-shaped member.
Figure 3:
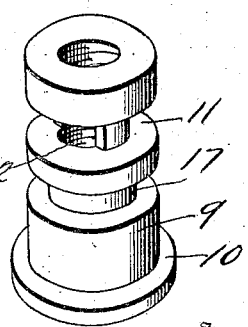
Figure 3 is a perspective view of the member threaded on the valve stem.

Referring to the drawing, the numeral 1 designates a conventional form of automobile wheel felly and 2 a demountable rim thereon, which rim holds the tire casing 3 in the usual manner. Disposed within the tire casing 3 is an inner tube 4, which inner tube is provided with a valve stem 5 which extends through an aperture 6 in the felly 1 and beyond the inner periphery 7 of the felly in the usual manner. Valve stem 5 is of a conventional structure and is provided with thread 8 at opposite sides thereof and with flattened surfaces 9 at opposite sides thereof. In removing the demountable rim which carries the tire casing as well as the inner tube 4, it is necessary to remove the valve stem 5 from the aperture 6 of the felly, consequently if the valve stem 5 is prevented from being removed from the felly the tire will be prevented from being removed from the wheel by unauthorized persons.

Threaded on the valve stem 5 is a cylindrical member 9, the lower end of which is provided with an annular flange 10, which engages a washer 11, preferably formed from rubber so that foreign matter and particularly water is excluded from passing through the aperture 6 in the felly to the tire. The cylindrical member 9 adjacent its upper end is provided with an annular channel 11, which extends inwardly at opposite sides beyond the adjacent sides of the threaded opening 12 in the cylindrical member, therefore it will be seen when the cylindrical member 9 is threaded onto the valve stem 5, the opposite arms 13 of a U-shaped member 14 will engage the opposite flat surfaces 9 of the valve stem, and when the member 14 is in position and the member 9 threaded on the valve stem, rotation of the member 9 is positively prevented in either direction. After the U-shaped member 14 is placed in position the lock casing 15 is placed thereover, which lock casing entirely houses the member 9 and the member 14, and rests on the annular flange 10 of the threaded member 9, and when so positioned is held against upward movement by the engagement of the bolt 16 within the lock casing 15 with the annular channel 17 in the threaded member 9, and its downward movement is limited by the annular flange 10, therefore it will be seen that the threaded member 9 and the U-shaped member 14 are entirely housed and they are prevented from rotation and are positively locked to the valve stem 5. Bolt 16 is held in engagement with the annular channel 17 by the expansion spring 18 and the keeper may be moved to unlocked position against the action of the spring 18 by means of a key 19. The lock mechanism is of a conventional form and it is to be understood that any kind of a lock mechanism can be used, and applicant does not limit himself to any particular form of mechanism for controlling the bolt 16. A dust cap 20 is threaded on the upper end of the valve stem 5, and engages the upper side of the casing 13, and which dust cap not only prevents dust from entering the upper end of the valve but also cooperates with the upper side of the lock casing 15, and prevents dust and foreign matter from entering the casing 15 and the mechanism therein.

From the above it will be seen that a valve carried lock is provided for automobile tires, which lock is simple in construction, the parts reduced to a minimum, and one which may be cheaply manufactured and sold.

The invention having been set forth what is claimed as new and useful is:—

1. The combination with a threaded tire valve extending through a wheel felly, said tire valve having opposite flattened surfaces, of a locking device for said valve, said locking device comprising a member threaded on the valve, said member at opposite sides thereof being provided with recesses registering with the opposite flattened sides of the valve, a U-shaped member, said U-shaped member having its arms disposed in the recesses of the member threaded on the valve and engaging the opposite flattened sides of the valve, a casing entirely housing said member threaded on the valve and the U-shaped member, a lock bolt, said lock bolt cooperating with an annular channel in the member threaded on the valve and mechanism for controlling the lock bolt.

2. The combination with a tire valve stem having flattened sides and extending through a felly of a wheel, of a locking device for said stem, said locking device comprising a member threaded on the stem, a U-shaped member, the arms of the U-shaped member being disposed in recesses in opposite sides of the member threaded on the stem and engaging the opposite flattened sides of the stem, an annular flange carried by the lower end of the member threaded on the stem, a lock casing engaging the upper side of the annular flange and the upper side of the member threaded on the stem and entirely housing said member and the U-shaped member, and a lock bolt disposed within the casing and cooperating with an annular channel in the member threaded on the stem.

3. The combination with a valve stem lock comprising a member threaded on the stem, a lock casing housing said member, and locked thereto, of a U-shaped member, said U-shaped member having its arms disposed in oppositely disposed recesses in the member threaded on the stem and engaging the opposite flat sides of the stem, said U-shaped member forming means whereby upward or downward movement of the member threaded on the stem is prevented, said U-shaped member being entirely housed in the casing.

In testimony whereof I hereunto affix my signature.

HAROLD CARTWRIGHT PIERCE.